(12) United States Patent
Phoon et al.

(10) Patent No.: US 10,766,154 B2
(45) Date of Patent: Sep. 8, 2020

(54) SYSTEM AND METHOD FOR TREATING A PART OF A BODY

(71) Applicant: KONINKLIJKE PHILIPS N.V., Eindhoven (NL)

(72) Inventors: Kin Fatt Phoon, Eindhoven (NL); Jacob Hendrik Botma, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2 days.

(21) Appl. No.: 15/999,765

(22) PCT Filed: Feb. 9, 2017

(86) PCT No.: PCT/EP2017/052798
§ 371 (c)(1),
(2) Date: Aug. 20, 2018

(87) PCT Pub. No.: WO2017/140564
PCT Pub. Date: Aug. 24, 2017

(65) Prior Publication Data
US 2019/0337172 A1 Nov. 7, 2019

(30) Foreign Application Priority Data
Feb. 16, 2019 (EP) .................................... 16156496

(51) Int. Cl.
B26B 19/38 (2006.01)
G06T 7/50 (2017.01)
(Continued)

(52) U.S. Cl.
CPC ............ *B26B 19/388* (2013.01); *B26B 19/20* (2013.01); *G06K 9/00362* (2013.01); *G06T 7/13* (2017.01);
(Continued)

(58) Field of Classification Search
CPC .. B26B 19/388; B26B 19/20; G06K 9/00362; G06T 7/50; G06T 7/13; G06T 7/70;
(Continued)

(56) References Cited

U.S. PATENT DOCUMENTS 6,681,151 B1 * 1/2004 Weinzimmer ......... B25J 9/1697
219/121.85
2008/0009697 A1 * 1/2008 Haider .................. A61B 17/15
600/407

(Continued)

FOREIGN PATENT DOCUMENTS

WO 2013096572 A1 6/2013
WO 2015067634 A1 5/2015

Primary Examiner — Kenneth E Peterson
Assistant Examiner — Nhat Chieu Q Do

(57) ABSTRACT

A treating system includes a controller and a treating device having a treating unit for treating a part of a body of a subject. An imaging arrangement is configured to obtain image data. The controller is configured to analyze the image data to identify a boundary between the part of the body of the subject and the environment around the part of the body; and determine the position of the treating device relative to the part of the body of the subject based on a position of the boundary in the image data.

19 Claims, 7 Drawing Sheets

(51) Int. Cl.
*G06T 7/13* (2017.01)
*G06T 7/70* (2017.01)
*B26B 19/20* (2006.01)
*G06K 9/00* (2006.01)
*G06T 7/90* (2017.01)

(52) U.S. Cl.
CPC ............... *G06T 7/50* (2017.01); *G06T 7/70* (2017.01); *G06T 7/90* (2017.01); *G06T 2207/10024* (2013.01); *G06T 2207/10048* (2013.01); *G06T 2207/30196* (2013.01)

(58) Field of Classification Search
CPC . G06T 2207/10024; G06T 2207/10048; G06T 2207/30196
USPC ........ 600/407; 700/218, 114, 164, 253, 258, 700/255; 30/194–225, 355
See application file for complete search history.

(56) References Cited

U.S. PATENT DOCUMENTS

| | | | |
|---|---|---|---|
| 2009/0055024 A1* | 2/2009 | Kay | B25J 9/1697 700/259 |
| 2010/0170052 A1* | 7/2010 | Ortins | A46B 15/0002 15/106 |
| 2011/0208256 A1* | 8/2011 | Zuhars | A61F 2/30756 606/86 R |
| 2011/0282492 A1* | 11/2011 | Krause | B25J 9/1664 700/259 |
| 2012/0113268 A1* | 5/2012 | Ito | H04N 5/2251 348/169 |
| 2013/0021460 A1 | 1/2013 | Burdoucci | |
| 2013/0315470 A1 | 11/2013 | Watson | |
| 2014/0137883 A1* | 5/2014 | Rothschild | B26B 19/388 132/200 |
| 2014/0182138 A1 | 7/2014 | Krenik | |
| 2015/0059187 A1 | 3/2015 | Krenik | |
| 2015/0197016 A1* | 7/2015 | Krenik | B26B 19/3806 83/13 |
| 2015/0320514 A1* | 11/2015 | Ahn | A61B 34/30 606/130 |

* cited by examiner

SYSTEM AND METHOD FOR TREATING A PART OF A BODY

This application is the U.S. National Phase application under 35 U.S.C. § 371 of International Application No. PCT/EP2017/052798, filed on Feb. 9, 2017, which claims the benefit of European Application No. 16156496.8 filed on Feb. 19, 2016. These applications are hereby incorporated by reference herein.

FIELD OF THE INVENTION

The present invention relates to a system for treating a part of a body to be treated. For example, the present invention relates to a system for cutting hair on a part of a body to be treated. The present invention also relates to a method for treating a part of a body to be treated.

BACKGROUND OF THE INVENTION

Systems for treating a part of a body, for example by cutting hair on a part of a body to be treated (such as a human or animal body), include powered hand-held devices, for example trimmers, that are placed against a part of a user's or subject's body and moved over areas where hair is to be cut. Such systems include mechanical hair cutting devices. The user of the system typically selects a cutting length by adjusting or selecting a guide, such as a comb or guard, which extends over a cutting blade and then selects which areas of hair to cut and which areas should not be cut by positioning and moving the device appropriately.

When cutting a user's own hair, or someone else's hair, significant skill is required to create a particular hairstyle or to provide a presentable result. Therefore efforts are being made to provide systems that are able to automatically cut hair and create a particular hairstyle. Some types of devices are held by the subject or user during use and the hair cutting length is adjusted automatically according to the position of the device on the part of the body. Thus, these types of devices require some means to enable the device to determine its position on the part of the body.

WO 2013/096572 describes one such automated hair cutting system in which a positioning structure is placed on a user and a hair cutting device interacts with the positioning structure to determine a position of the hair cutting device relative to a reference point.

SUMMARY OF THE INVENTION

It will be appreciated that systems such as those shown in WO 2013/096572 that require a structure to be worn by or placed on the user are not particularly convenient for a subject to use, and it is desirable to provide a system and/or method for treating a part of a body to be treated which substantially alleviates or overcomes the problems mentioned above and does not require a positioning structure separate to the hand held device to be used.

According to a first aspect, there is provided a treating system comprising a controller and a treating device, the treating device comprising: a treating unit for treating a part of a body of a subject; and an imaging arrangement that is configured to obtain image data; wherein the controller is configured to analyse the image data to identify a boundary between a part of a body of a subject and the environment around the part of the body; and determine the position of the treating device relative to the part of the body of the subject based on a position of the boundary in the image data.

In some embodiments, the controller is comprised in the treating device. In alternative embodiments, the controller is comprised in a base unit for the treating device, and the treating device is configured to transmit the image data to the controller in the base unit.

In some embodiments, the imaging arrangement comprises a temperature, thermal or infra-red, IR, sensor or sensor array. In these embodiments the controller can be configured to identify the boundary based on a difference between the heat emitted by the subject relative to the heat emitted by the surrounding environment.

In alternative embodiments, the imaging arrangement comprises a visible light sensor or sensor array. In these embodiments, the controller is configured to identify the boundary based on a difference between the colour and/or shape of the part of the body relative to the colour and/or shape of the surrounding environment.

In some embodiments, the controller is configured to determine the position of the treating device based on the distance of the boundary from an edge of an image derived from the image data.

In some embodiments, the part of the body of the subject is the head of the subject, and the controller is configured to determine the height of the treating device on the head based on the distance of the boundary from an upper or lower edge of an image derived from the image data.

In some embodiments, the part of the body of the subject is the head of the subject, and the controller is configured to identify an car of the subject in the image data and (i) determine the height of the treating device on the head based on the distance of the boundary from an upper or lower edge of the image and the position of the ear in the image; and/or (ii) determine whether the treating device is on a side or the back of the head based on the position of the ear in an image derived from the image data.

In alternative embodiments, the imaging arrangement comprises one or more range sensors that arc configured to measure the distance from the imaging arrangement to a nearest object in one or more predefined directions from the imaging arrangement. In these embodiments, the controller can be configured to identify the boundary based on which of the measured distances exceed a threshold.

In alternative embodiments, the imaging arrangement comprises one or more proximity sensors that are configured to detect whether there is an object within a threshold distance to the imaging arrangement in one or more predefined directions from the imaging arrangement. In these embodiments, the controller can be configured to identify the boundary based on which of the predetermined direction an object is detected within the threshold distance.

In some embodiments, the controller is further configured to determine a treating action for the part of the body of the subject at the determined position of the treating device; and output a control signal to the treating unit to configure the treating unit to perform the determined treating action.

In some embodiments, the controller is further configured to determine whether a treating action is required for the part of the body of the subject at the determined position of the treating device; and output a control signal to the treating unit to activate or deactivate the treating unit according to whether a treating action is required.

In some preferred embodiments, the treating system is a hair cutting system, the treating device is a cutting device, and the treating unit is a cutting unit for cutting hair on the subject.

In these embodiments, a hair cutting length of the cutting unit can be configurable based on a control signal from the controller, and the controller can be further configured to determine a hair length for the hair of the subject at the determined position of the hair cutting device; and output a control signal to the cutting unit to configure the cutting unit to cut hair to the determined hair length.

In these embodiments, the controller can be configured to determine the hair length for the hair of the subject according to a predetermined pattern that specifies a hair length at a plurality of possible positions of the hair cutting device on the part of the body of the subject.

In these embodiments, the part of the body of the subject can be the head of the subject, and the controller can be configured to determine a shorter hair length for the hair of the subject if the hair cutting device is determined to be at the side of the head than the hair length if the hair cutting device is determined to be on the top of the head.

In these embodiments, the part of the body of the subject can be the head of the subject, and the controller can be configured to determine a first hair length for the hair of the subject when the hair cutting device is determined to be near or at the hair line on the sides or back of the head of the subject and a second hair length for the hair when the hair cutting device is determined to be away from the hair line on the sides and back of the head, wherein the first hair length is shorter than the second hair length.

According to a second aspect, there is provided a method of determining the position of a treating device of a treating system, the treating device comprising a treating unit for treating a part of a body of a subject; the method comprising obtaining image data using an imaging arrangement; analysing the image data to identify a boundary between a part of a body of a subject and the environment around the part of the body; and determining the position of the treating device relative to the part of the body of the subject based on a position of the boundary in the image data.

In some embodiments, the imaging arrangement comprises a temperature, thermal or infra-red, IR, sensor or sensor array. In these embodiments the step of analysing can comprise identifying the boundary based on a difference between the heat emitted by the subject relative to the heat emitted by the surrounding environment.

In alternative embodiments, the imaging arrangement comprises a visible light sensor or sensor array. In these embodiments, the step of analysing can comprise identifying the boundary based on a difference between the colour and/or shape of the part of the body relative to the colour and/or shape of the surrounding environment.

In some embodiments, the step of determining can comprise determining the position of the treating device based on the distance of the boundary from an edge of an image derived from the image data.

In some embodiments, the part of the body of the subject is the head of the subject, and the step of determining can comprise determining the height of the treating device on the head based on the distance of the boundary from an upper or lower edge of an image derived from the image data.

In some embodiments, the part of the body of the subject is the head of the subject, and the method further comprises the step of identifying an ear of the subject in the image data and wherein the step of determining comprises determining the height of the treating device on the head based on the distance of the boundary from an upper or lower edge of the image and the position of the ear in the image.

In some embodiments, the part of the body of the subject is the head of the subject, and the method further comprises the step of identifying an ear of the subject in the image data and the step of determining comprises determining whether the treating device is on a side or the back of the head based on the position of the ear in an image derived from the image data.

In alternative embodiments, the imaging arrangement comprises one or more range sensors that are configured to measure the distance from the imaging arrangement to a nearest object in one or more predefined directions from the imaging arrangement. In these embodiments, the step of analysing can comprise identifying the boundary based on which of the measured distances exceed a threshold.

In alternative embodiments, the imaging arrangement comprises one or more proximity sensors that are configured to detect whether there is an object within a threshold distance to the imaging arrangement in one or more predefined directions from the imaging arrangement. In these embodiments, the step of analysing can comprise identifying the boundary based on which of the predetermined direction an object is detected within the threshold distance.

In some embodiments, the method further comprises the steps of determining a treating action for the part of the body of the subject at the determined position of the treating device; and outputting a control signal to the treating unit to configure the treating unit to perform the determined treating action.

In some embodiments, the method further comprises the steps of determining whether a treating action is required for the part of the body of the subject at the determined position of the treating device; and outputting a control signal to the treating unit to activate or deactivate the treating unit according to whether a treating action is required.

In some preferred embodiments, the treating system is a hair cutting system, the treating device is a cutting device, and the treating unit is a cutting unit for cutting hair on the subject.

In these embodiments, a hair cutting length of the cutting unit can be configurable based on a control signal, and the method can further comprise the steps of determining a hair length for the hair of the subject at the determined position of the hair cutting device; and outputting a control signal to the cutting unit to configure the cutting unit to cut hair to the determined hair length.

In these embodiments, the step of determining a hair length can comprise determining the hair length for the hair of the subject according to a predetermined pattern that specifies a hair length at a plurality of possible positions of the hair cutting device on the part of the body of the subject.

In these embodiments, the part of the body of the subject can be the head of the subject, and the step of determining a hair length can comprise determining a shorter hair length for the hair of the subject if the hair cutting device is determined to be at the side of the head than the hair length if the hair cutting device is determined to be on the top of the head.

In these embodiments, the part of the body of the subject can be the head of the subject, and the step of determining a hair length can comprise determining a first hair length for the hair of the subject when the hair cutting device is determined to be near or at the hair line on the sides or back of the head of the subject and a second hair length for the hair when the hair cutting device is determined to be away from the hair line on the sides and back of the head, wherein the first hair length is shorter than the second hair length.

According to a third aspect, there is provided a computer program product comprising a computer readable medium having computer readable code embodied therein, the computer readable code being configured such that, on execution by a suitable computer or processor, the computer or processor is caused to perform any of the methods described above.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

As described above, it is desirable to provide automated systems for cutting hair or performing another type of treatment to the body that are capable of determining their position relative to the part of the body to be treated without requiring the use of a positioning structure or other separate piece of apparatus that has to be worn, carried or otherwise placed on the subject.

The present invention therefore provides a technique that enables a device that is used in close proximity to or in contact with a part of the body to be treated to determine its position relative to the part of the body of a subject just using an imaging arrangement on the device. In particular, image data is obtained using an imaging arrangement, and this image data is analysed to identify a boundary between a part of a body of a subject and the environment around the part of the body. The position of the boundary in the image data will vary based on the position of the device relative to the part of the body, and thus the boundary position can be related to the position of the device relative to the part of the body.

For example, where the image data is an infra-red (IR) image obtained using an 1R camera or other image data indicating temperature differences, the image data can be analysed to determine the 'warm' parts of the image data corresponding to a part of the body of the subject and the 'cold' parts of the image data corresponding to the environment around the subject. The position of the boundary between these warm and cold parts in the image data can be used to determine the position of the device relative to the part of the body of the subject. In alternative embodiments the image data can be very 'coarse' (i.e. comprising very few 'pixels') that can be obtained using one or more range sensors or proximity sensors that measure the distance to a nearest object in a plurality of predefined directions from the sensor. The image data can be analysed to determine the close parts of the image data corresponding to the part of the body of the subject and the distant parts of the image data corresponding to the environment around the subject. The position of the boundary between the close and distant parts in the image data can be used to determine the position of the device relative to the part of the body of the subject. The above embodiments are described in more detail below with reference to FIGS. 4-8.

Figure 1:
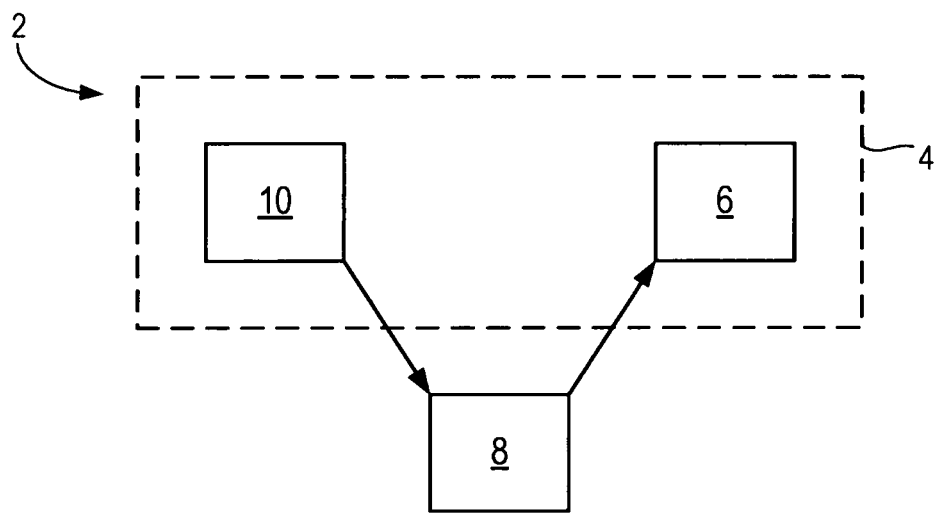
FIG. 1 is a block diagram of a system according to an embodiment.

FIG. 1 shows a system 2 for treating a part of a body to be treated according to a general embodiment of the invention. The system 2 comprises a hand-held treating device 4 that can be held by a user and used on a part of a body of a subject. The subject can be the person that is using and operating the device 4 (i.e. the user is using the device 4 on themselves) or the subject can be a different person to the user of the device 4. In the embodiments described below, it is assumed that the user of the system 2/treating device 4 is the person being treated (i.e. the user is using the system 2 to treat themselves).

The treating device 4 includes a treating unit 6 that performs a treating action on the part of the body to be treated. In preferred embodiments the treating action is the cutting of hair on the part of the body (e.g. hair on the user's head, face, chest, legs, etc.), in which case the treating unit 6 is a cutting unit. In the most preferred embodiments, the part of the body is the head, and the treating action is the cutting of hair. In alternative embodiments, the treating action is massaging the part of the body, in which case the treating unit 6 can comprise one or more components for applying pressure to and/or manipulating the part of the body. In other alternative embodiments, the treating action is the application of a tattoo to the part of the body, in which case the treating unit 6 can comprise one or more components (e.g. needles) for applying ink to or into the skin of the part of the body. Those skilled in the art will be aware of other types of treating action and treating units that can be used in a system 2 according to the invention.

The system 2 also includes a controller 8 that is configured to perform the method according to the invention and, in some embodiments, to control the operation of the treating device 4 in accordance with the invention. In some embodiments the controller 8 is part of the treating device 4, but in other embodiments the controller 8 is in a different part of the system 2 to the treating device 4. For example the system 2 can comprise a base unit (e.g. a docking and/or charging station for the treating device 4) and the controller 8 can be part of that base unit. In the embodiments where the controller 8 is in a separate part of the system 2 to the treating device 4, the treating device 4 may comprise a respective controller and/or other circuitry (e.g. transceiver circuitry) that can be configured to exchange control signals and/or other information or data (e.g. image data) with the controller 8 and to control the operation of the treating device 4 accordingly. The controller 8 can be any suitable type of electronic component, such as a processor, control unit, processing unit, multi-core processor, etc. Although not shown in FIG. 1, the controller 8 may have an associated memory unit that can be used for storing program code that can be executed by the controller 8 to perform the method described herein.

The treating device 4 also comprises an imaging arrangement 10 that is located in or on the treating device 4 and that is for obtaining image data. The imaging arrangement 10 is positioned on the treating device 4 so that it can obtain image data corresponding to the region around the treating unit 6, e.g. including the part of the body subject that is being treated, as well as the environment around the treating device 4 as the treating device 4 is being used.

The imaging arrangement 10 can be any suitable type of device or component that enables a contrast to be identified between the part of the body of the subject to be treated and the environment around the subject. As noted above, the position sensing technique according to the invention uses this contrast to identify the position of a boundary between the subject and the environment in the image data, and the position of the boundary is used to determine the position of the treating device 4.

In some embodiments, the imaging arrangement 10 can comprise an infra-red (IR) sensor (or IR sensor array) or IR camera, a heat sensor (or heat sensing array), a visible light sensor (or sensor array) or camera, one or more proximity sensors that enables proximity to an object in one or more directions from the treating device 4 to be determined, or one or more distance sensors that enables the distance to the nearest object in one or more directions from the treating device 4 to be measured or determined. The proximity sensor(s) and/or distance sensor(s) can be based on any suitable technology, for example time-of-flight distance measurements using light (e.g. laser light) or sound (e.g. ultrasound), or proximity based on ultrasound, infrared, temperature/heat, laser light, etc. Those skilled in the art will appreciate that other types of imaging arrangements 10 to those described can be used in alternative embodiments of the invention.

In the rest of this detailed description the invention will be described with reference to a system 2 comprising a cutting device 4 that is for cutting or shaving hair. However, it will be appreciated by those skilled in the art that the teaching of the embodiments in the following description, and in particular the techniques for determining the position of the cutting device 4 on the body of the subject, are readily applicable to systems for performing other types of treatment on a part of the body, for example applying a tattoo to the skin, massaging the skin, etc.

Figure 2:
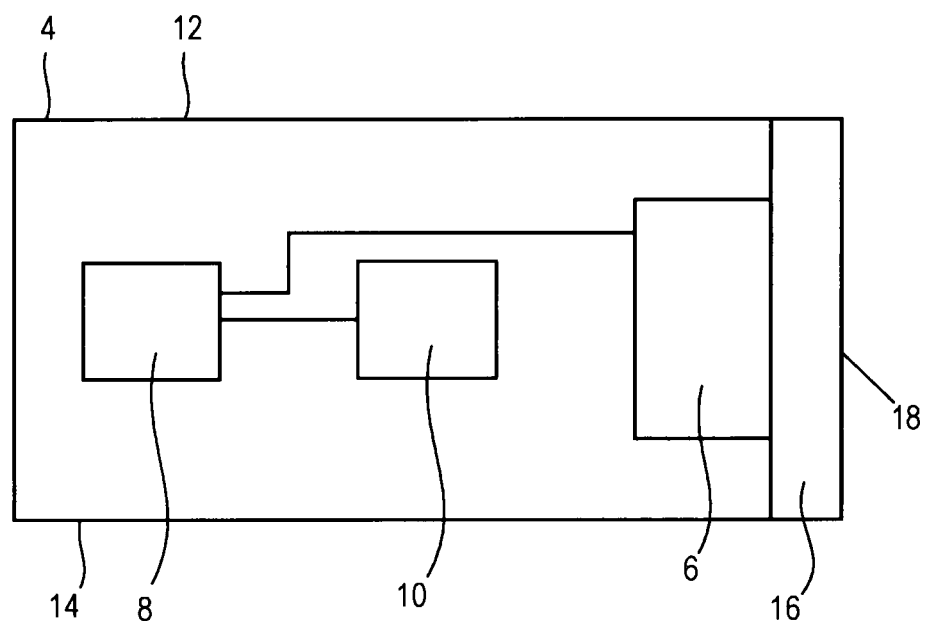
FIG. 2 is a schematic diagram of a hand held cutting device according to an embodiment.

Thus, FIG. 2 illustrates a hair cutting system 2 that comprises a hand held hair cutting device 4. In this illustrated embodiment the controller 8 is part of the cutting device 4. As noted above the cutting device 4 also comprises a cutting unit 6 and an imaging arrangement 10. In use the cutting device 4 is moved over the skin of a part of a subject's body, for example their head, to cut, trim or shave hair on that part of the body.

The controller 8 receives image data from the imaging arrangement 10 during use of the cutting device 4 and controls the operation of the cutting unit 6 (for example controlling a cutting action and/or controlling a cutting length of the cutting unit 6). In the present embodiment the controller 8, the imaging arrangement 10 and the cutting unit 6 communicate via a wired connection, but alternative arrangements are envisaged. For example, the controller 8, the imaging arrangement 10 and the cutting unit 6 may be connected by a wireless connection (and it will be appreciated that a wireless connection may be used in the embodiments where the controller 8 is not part of the cutting device 4. Wireless modules (not shown in FIG. 2), for example radio or infra-red transmitters and receivers, act to wirelessly connect the different components of the system 2. Suitable wireless technologies include Bluetooth, Zigbee, Wi-Fi, etc. Controller 8 may also be able to connect wirelessly to other devices or components external to system 2.

The imaging arrangement 10 is configured in the cutting device 4 to obtain image data for at least a region in front of the cutting device 4, i.e. from the imaging arrangement 10 towards and beyond the cutting unit 6, so that in use, the image data from the imaging arrangement 10 will include image data relating to the part of the body to be/being treated and/or the environment around the part of the body to be/being treated.

The cutting device 4 comprises a main body 12 with the cutting unit 6 at one end of the main body 12. The main body 12 defines a handle portion 14. The body 12 and the cutting unit 6 are arranged so that the handle portion 14 is able to be held by a user.

The cutting unit 6 is configured to trim or cut hair and may comprise any suitable mechanism for cutting hair. For example, the cutting unit 6 can comprise a cutting mechanism that has a stationary treating element (e.g. a stationary cutting blade) and a moveable treating element (e.g. a moveable cutting blade) which is moved by a driver or actuator (e.g. an electric motor) that moves the moveable treating element relative to the stationary treating element. Hairs protrude past the stationary treating element, and are cut by a shearing action due to the movement of the moveable treating element. As another example, the cutting unit 6 can comprise a foil through which hairs protrude, and a moving blade moves over the foil to cut the protruding hairs.

In this illustrated embodiment the cutting device 4 has a guide 16 that has a guide face 18. The guide face 18 forms an end surface. In use the guide face 18 is disposed against the part of the body on which hair is to be cut. The guide face 18 is spaced from the cutting unit 6. However, in some embodiments the cutting unit 6 and/or the guide 16 may be adjustable so that the guide face 16 and the cutting unit 6 lie planar with each other. The guide face 18 is arranged to space the cutting unit 6 from the part of the body on which hair is to be cut, for example the skin of a subject's head, in order to control the length of the hair that is left after cutting. In another embodiment the guide 16 may be omitted.

In some embodiments, the guide 16 is a comb. The guide 16 has a plurality of parallel, but spaced, comb teeth (not shown in FIG. 2). The spaced comb teeth allow the passage of hair therebetween so that the hair is exposed to the cutting unit 6 and cut by the cutting unit 6. A distal surface of each tooth from the main body 12 forms the guide face 18. The guide 16 can be mounted to the main body 12 or to the cutting unit 6. The guide 16 can be removably mounted to the main body 12. The guide 16 can be interchangeable with another guide and/or replaced in order to adjust the length of hair that is left after cutting.

In some embodiments, the cutting length of the cutting unit 6 can be automatically adjusted according to a control signal from the controller 8. For example the distance between the cutting unit 6 and the guide face 18 can be adjusted to effect a change in the cutting length. Those skilled in the art will be aware of various types of cutting unit 6/cutting device 4 in which the cutting length can be automatically controlled.

It will be appreciated that the components and features of the system 2 shown in FIGS. 1 and 2 are not exhaustive, and actual implementations of system 2 will include further components and features to those shown and described above. For example the cutting device 4 may include a power supply, such as a battery, or means for connecting the cutting device 4 to a power supply. Alternatively or in addition, the cutting device 4 or other part of the system 2 may comprise one or more buttons, controls, or other user interface elements to allow a user to control the operation of the system 2.

Figure 3:
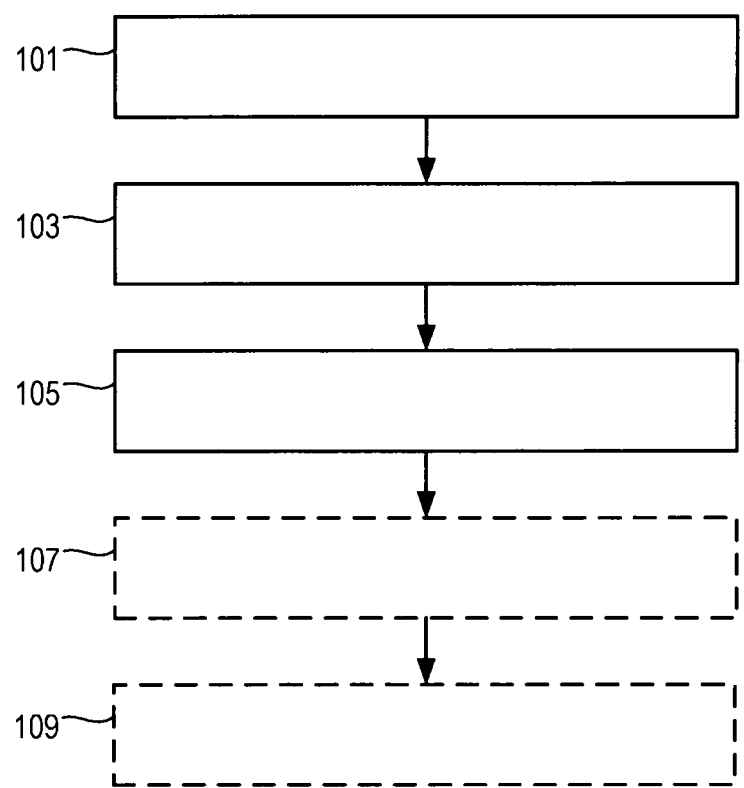
FIG. 3 is a flow chart illustrating a method according to an embodiment of the invention.

FIG. 3 shows a flow chart of a method of determining the position of a cutting device 4 according to the invention. As noted above, although the method is described with reference to a cutting device 4, it will be appreciated that the method is applicable to any type of treating device 4. Also as noted above, program code for enabling the controller 8 to perform this method may be stored in a memory unit associated with the controller 8.

Figure 4:
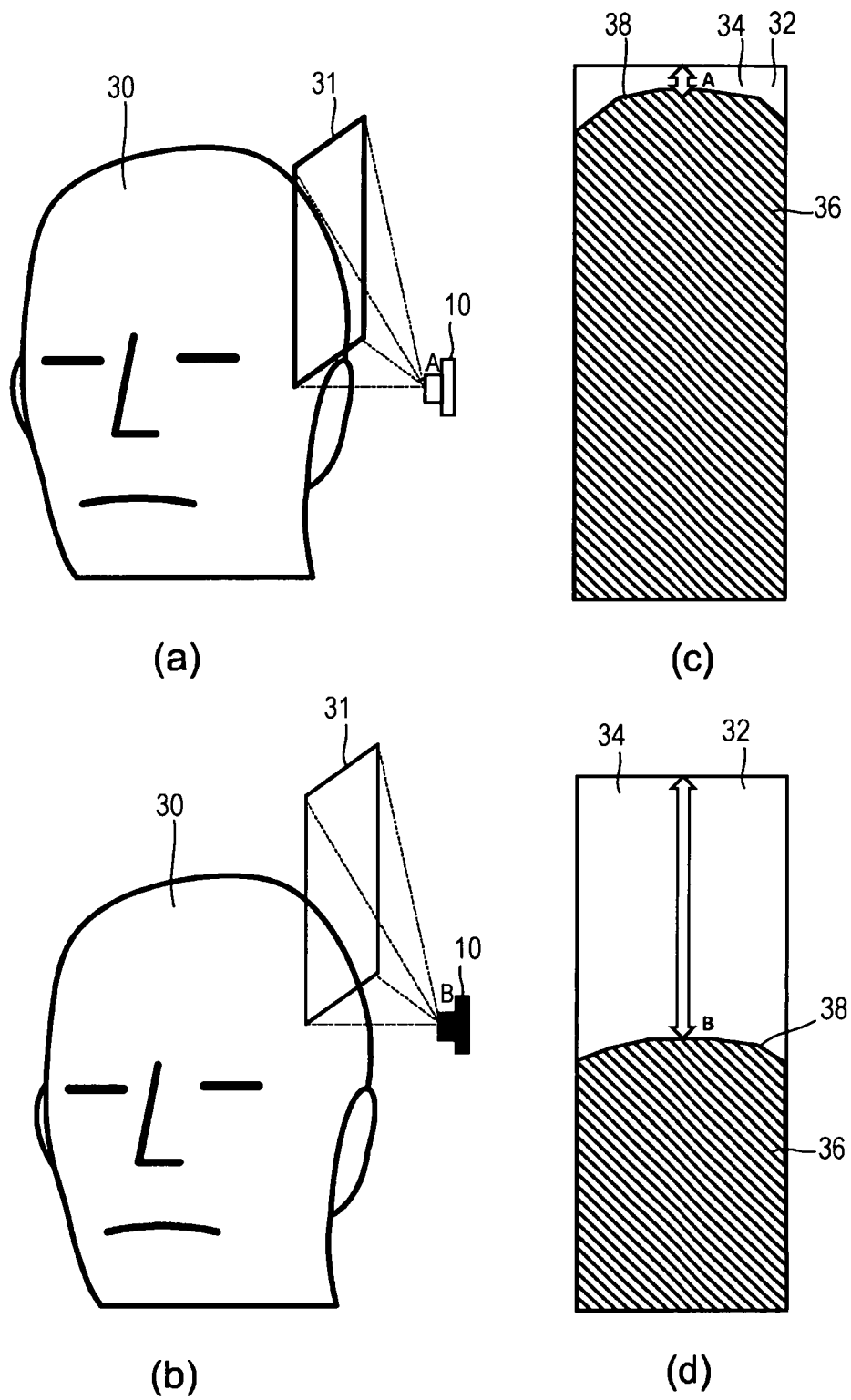
FIG. 4 illustrates a device in use on a subject and corresponding images obtained by an imaging arrangement at first and second positions on the subject.

The method in FIG. 3 is also described with reference to FIG. 4 which illustrates the general concept employed by the present invention. FIG. 4 shows an imaging arrangement 10 for a cutting device 4 in two different positions relative to the head of a subject 30 when the cutting device 4 is in contact with the head of the subject 30. FIG. 4(*a*) shows the imaging arrangement 10 in position A in which the imaging arrangement 10 is approximately level with a part of the ear of the subject 30, and FIG. 4(*b*) shows the imaging arrangement 10 in position B in which the imaging arrangement 10 is above the ear of the subject 30. For ease of illustration, the cutting device 4 is not shown in FIG. 4.

In step 101, image data is obtained by imaging arrangement 10. As noted above, the image data will relate to an area or region 31 in front of the cutting device (i.e. in the direction of the subject). The type of image data obtained will depend on the type of imaging arrangement 10 in or on the cutting device 4, as described in more detail below. Step 101 can comprise operating the imaging arrangement 10 to obtain the image data, receiving image data from an imaging arrangement 10 via a wired or wireless connection, or retrieving previously-obtained image data from a memory unit.

A graphical representation 32 of the image data (e.g. an image derived from the image data 32) obtained in position A is shown in FIG. 4(*c*), and a graphical representation 32 of the image data obtained in position B is shown in FIG. 4(*d*).

The controller 8 receives the image data, and in step 103, the controller 8 analyses the image data to identify a boundary between a part of a body of a subject and the environment around the part of the body. In particular the controller 8 identifies the boundary based on a contrast in the image data between the part of the body of the subject to be treated and the environment around the subject.

Thus in step 103 the controller 8 identifies the contrasting portions 34, 36 of the image data, and in particular identifies portion 34 as being the environment around the part of the body of the subject 30 and portion 36 as being the part of the body of the subject 30. The controller 8 identifies the boundary as a line 38 running between these portions 34, 36. It can be seen that line 38 generally corresponds to the outline of the head of the subject 30 in the image data 32.

Next, in step 105, the controller 8 determines the position of the hair cutting device 4 relative to the part of the body to be/being treated based on the position of the boundary in the image data. In particular, the position of the boundary in the image data will vary based on the position of the cutting device 4 relative to the part of the body, and thus the boundary position can be related to the position of the cutting device 4 relative to the part of the body.

Thus, in position A, it can be seen in FIG. 4(*c*) that the head of the subject 30 almost completely fills the view of the imaging arrangement 10 and the boundary 38 is much closer to the top of the graphical representation 32 of the image data than boundary 38 in FIG. 4(*d*) where the head of the subject 30 does not fill the view of the imaging arrangement 10 as much. This difference is due to the different heights of the imaging arrangement 10 relative to the head of the subject 30. The distance of the boundary 38 from the top of the image 32 (or from the bottom of the image 32, whichever is preferred) can be used to determine the height of the cutting device 4 relative to the head of the subject 30. It will be appreciated that the height of the cutting device 4 relative to the head of the subject 30 can be given in terms of the vertical distance of the cutting device 4 from the top of the head.

In some embodiments, step 105 may involve the use of a look-up table that relates distances from the boundary 38 to the top or bottom edge of the image 32 to positions (e.g. vertical height) of the cutting device 4 relative to the head. The data in the look-up table may be predefined, or it can be determined through a calibration procedure in which the cutting device 4 is moved between different positions on the head of the subject 30, with image data 32 being obtained and analysed at each position to determine where the boundary 38 is located at that position.

As noted above, in some embodiments, the imaging arrangement 10 can comprise a temperature, thermal or infra-red (IR) sensor or sensor array (e.g. an IR camera) and the contrast between the subject and the environment can be identified based on the heat emitted by the subject relative to the heat emitted by the surrounding environment. In the example shown in FIG. 4, the subject portion 36 can be identified as the warmer or warmest parts of the image data 32, and the environment portion 34 can be identified as the cool or cooler parts of the image data 32. Techniques for the analysis of IR image data to identify a boundary 38 between warmer and colder parts of the image data 32 will be known to those skilled in the art.

In alternative embodiments, the imaging arrangement 10 can comprise a visible light sensor (or sensor array) or camera that obtains images based on visible light and the contrast can be identified based on the colour and/or shape of the subject relative to the surrounding environment. In the example shown in FIG. 4, the subject portion 36 can be identified based on a region of the same or similar colour (i.e. the colour of the hair) compared to the colour(s) of the rest of the image data 32, which would be identified as the environment portion 34. Alternatively (or in addition), shapes in the image data can be identified, and the boundary 38 identified based on those shapes.

As described below, as well as determining a vertical position or height of the cutting device 4 relative to the head of the subject 30, it can be possible to use the position of the boundary 38 and/or other features of the image data 32 to determine the horizontal or lateral position of the cutting device 4 on the subject's head. For example it can be possible to determine whether the cutting device 4 it at the side (i.e. left or right) or back of the subject's head. In particular, depending on the type of imaging arrangement 10 being used in the cutting device 4, it may be possible to identify the ear of the subject in the image data (for example through a contrast between the hair and ear, e.g. in temperature, appearance, light intensity, shape, etc.), and the position of the ear in the image data 32 can be used to identify the horizontal or lateral position of the cutting device 4. Likewise it may be possible to identify other facial features (e.g. eyes, nose, mouth, forehead, etc.) in the image data, or other features of the body, and use the position of these features to identify the horizontal or lateral position of the cutting device 4. It will also be appreciated that the position of the ear (or other feature) in the image or image data 32 can be used in combination with the position of the boundary 38 to determine the vertical position or height of the cutting device 4 relative to the head of the subject 30.

Figure 5:
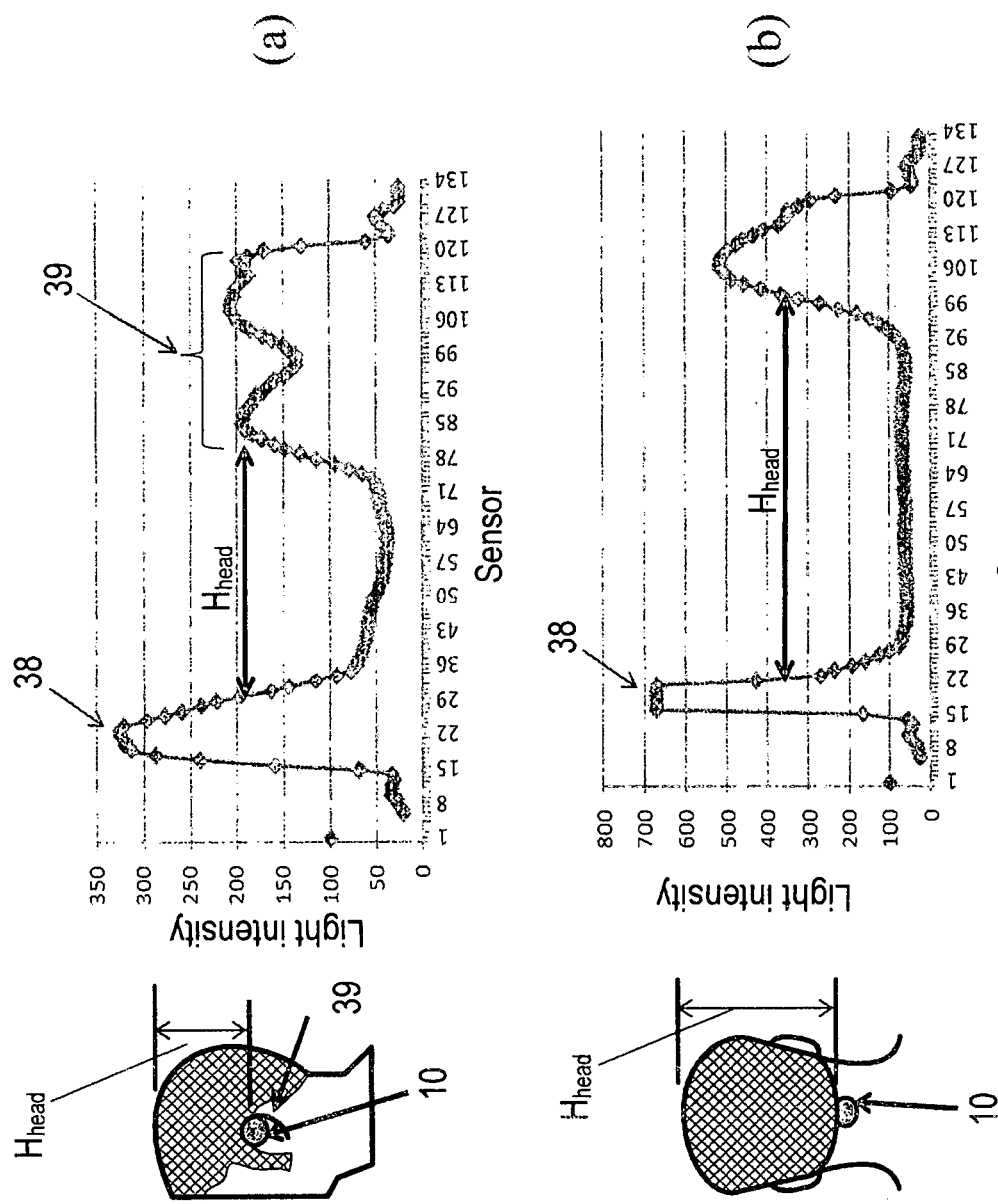
FIG. 5 illustrates image data obtained by an imaging arrangement at different positions according to another embodiment.

FIG. 5 shows how a visible light sensor array can be used to identify the vertical and horizontal positions of the cutting device 4 according to an embodiment. FIG. 5(a) shows an imaging arrangement 10 in the form of a camera sensor with 128 light sensors arranged in a line to form a 1×128 array that is positioned at the side of the head of a subject 30, approximately at the height of the ear 39 of the subject. The light sensors each measure the intensity or brightness of the incident light. The graph in FIG. 5(a) is a plot of the light intensity values for each of the 128 sensors in the array. The lower numbered sensors correspond to those at the top of the array (and thus image the top part of the head), and the higher numbered sensors correspond to those at the bottom of the array (and thus image the lower part of the head and ear). It can be seen in FIG. 5(a) that a boundary 38 can be identified where the brightness or intensity of the incident light becomes significantly higher than the neighbouring part of the image data (i.e. where there is a contrast in the image data 32), and the ear 39 can be identified due to the differences in light intensity of light from the ear 39 compared to light from the hair (and differences in light intensity from the structure of the ear). The distance $H_{head}$ is the height or distance of the hair on the head (i.e. the distance from the top of the ear to the top of the head). Thus, from this light intensity data, since the ear is detectable in the image data 32, it is possible to determine that the cutting device 4 is at the side of the head of the subject 30. In some embodiments, the vertical position of the ear can be considered together with the position of the boundary 38 to determine the vertical position of the cutting device 4 on the head of the subject 30.

FIG. 5(b) shows the same imaging arrangement 10 positioned at the back of the head at the hairline of the subject 30. The graph in FIG. 5(b) is a plot of the light intensity values for each of the 128 sensors in the array (again with the lower numbered sensors imaging an upper portion of the head and the higher numbered sensors imaging a lower portion of the head). It can be seen in FIG. 5(b) that a boundary 38 can be identified where the brightness or intensity of the incident light becomes significantly higher than the neighbouring part of the image data (i.e. the image data corresponding to the hair on the head), and the neck can be identified due to an increase in the light intensity from the skin of the neck. The distance $H_{head}$ in this case is the height or distance of the hair on the head (i.e. the distance from the hair line to the top of the head). An analysis of the light intensity profile will show that an ear is not visible in the image data 32 (e.g. as it is in FIG. 5(a)). Thus, from this light intensity profile, since the ear is not detectable, it is possible to determine that the cutting device 4 is at the back of the head of the subject 30.

It will be appreciated that similar profiles to those shown in FIG. 5 can be achieved using an infrared sensor array.

In other embodiments the contrast, and hence the boundary 38, can be identified based on measurements of the distance to the nearest object (or proximity to an object) in one or more known directions. The proximity sensor(s) and/or distance sensor(s) can be based on any suitable technology, for example time-of-flight distance measurements using light (e.g. laser light) or sound (e.g. ultrasound), or proximity based on ultrasound, infrared, temperature/ heat, laser light, etc. The distance/proximity embodiments are described in more detail with reference to FIGS. 6, 7 and 8.

Figure 6:
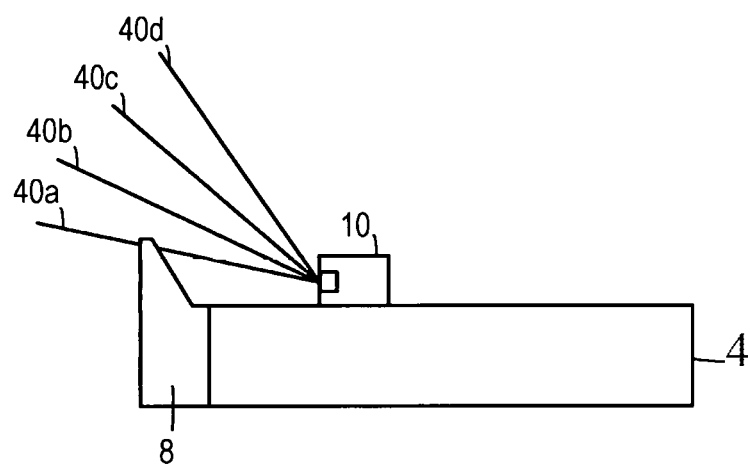
FIG. 6 is a schematic diagram of a hand held cutting device according to an embodiment.

In particular, FIG. 6 shows a side view of a hand held cutting device 4 that comprises an imaging arrangement 10 that measures distance or proximity in a plurality of directions. Four measuring 'directions' are shown in FIG. 6, at different angles to each other, which are labelled 40a, 40b, 40c and 40d. The imaging arrangement 10 therefore measures the distance to the nearest object in each of directions 40a-40d. In the following discussion the directions 40a-40d are assumed to differ only in their angle with respect to the horizontal plane, which enables the controller 8 to determine the vertical position or height of the cutting device 4, but it will be appreciated that in some embodiments a distance or proximity-based imaging arrangement 10 can also measure distances in directions that deviate from the vertical plane to enable the controller 8 to determine the horizontal or lateral position of the cutting device 4 relative to the head of the subject 30.

Figure 7:
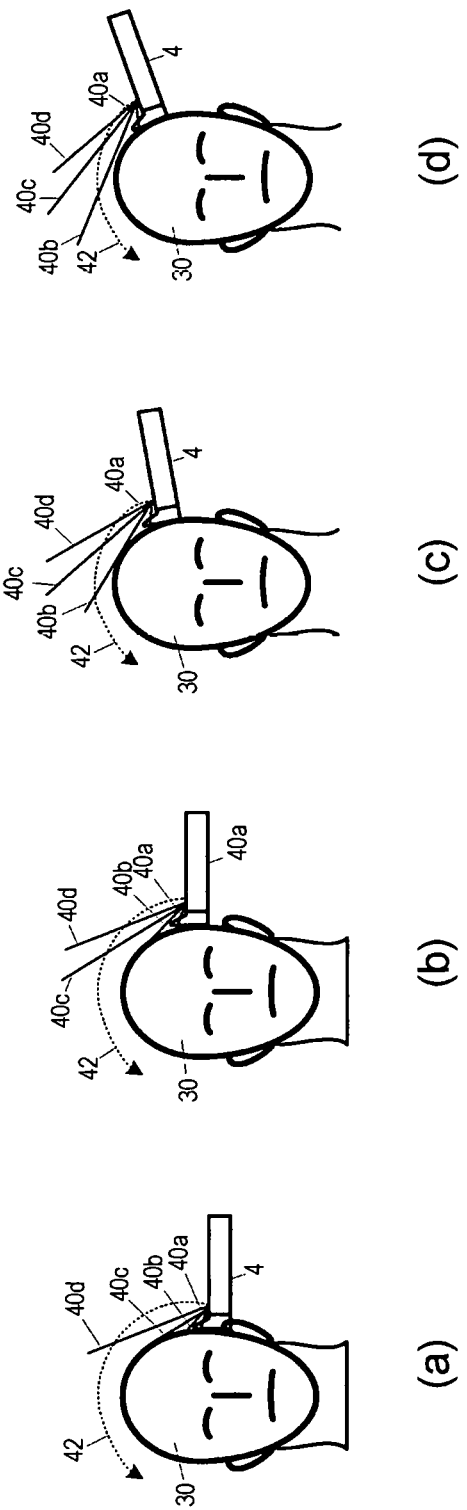
FIG. 7 illustrates a cutting device in four different positions with respect to the head of a subject.

FIG. 7 illustrates a cutting device in four different positions with respect to the head of a subject 30. In particular from FIGS. 7(a) to 7(d) the cutting device 4 is moved up the side and over the top of the head along a path 42. As the cutting device 4 is moved over the head, the distances measured in some or all of the measurement directions will change, and in particular, according to the curvature of the head, as the device 4 is moved up the side of the head, the measured distance in some of the directions may substantially change.

For example, in FIG. 7(a) the distance measured in directions 40a, 40b and 40c is quite short, e.g. a few centimeters, since the distance is the distance from the imaging arrangement 10 to the head of the subject 30 (with which the cutting device 4 is in contact), whereas the distance measured in direction 40d will be much larger since it will represent the distance from the imaging arrangement 10 to a part of the environment around the subject 30. In contrast, in FIG. 7(b) the cutting device 4 is higher on the side of the head than in FIG. 7(a), and therefore due to the curvature of the head at that height only the distance measured in directions 40a and 40b will be quite short, and the distance measured in direction 40c and 40d will be much larger. In the positions shown in FIGS. 7(c) and (d), only the distance measured in direction 40a will be relatively short due to the curvature of the head. The distances measured in each direction form the image data (e.g. with each measured distance being considered as a 'pixel' of the image), and the controller 8 analyses the image data to identify which direction or directions indicate a close object (i.e. the subject's head) and which direction or directions indicate a distant object (i.e. the environment), and the boundary 38 is determined to be between neighbouring directions where there is a large change in the measured distance (e.g. where the difference between the distance measurement is greater than, for example, 10 centimeters).

Thus, in the position shown in FIG. 7(a), the boundary 38 will be determined to be between directions 40c and 40d, whereas in the position shown in FIG. 7(b) the boundary 38 will be identified as being between directions 40b and 40c, and in the position shown in FIG. 7(c) the boundary 38 will be identified as being between directions 40a and 40b. Based on the position of the boundary 38, the controller 8 can determine the position of the cutting device 4 on the head of the subject 30.

As with the IR and visible light embodiments above, step 105 may involve the use of a look-up table that relates the directions between which the boundary 38 is found to a position (e.g. vertical height) of the cutting device 4 relative to the head. As before, the data in the look-up table may be predefined, or it can be determined through a calibration procedure in which the cutting device 4 is moved between different positions on the head of the subject 30, with image data 32 being obtained and analysed at each position to determine where the boundary 38 is located at that position.

It will be appreciated that the use of four measurement directions as shown in FIG. 7 is merely exemplary, and more or less directions can be used. The use of more measurement directions can be advantageous as it will improve the resolution of the boundary identification, and thus improve the accuracy of the position determination.

Figure 8:
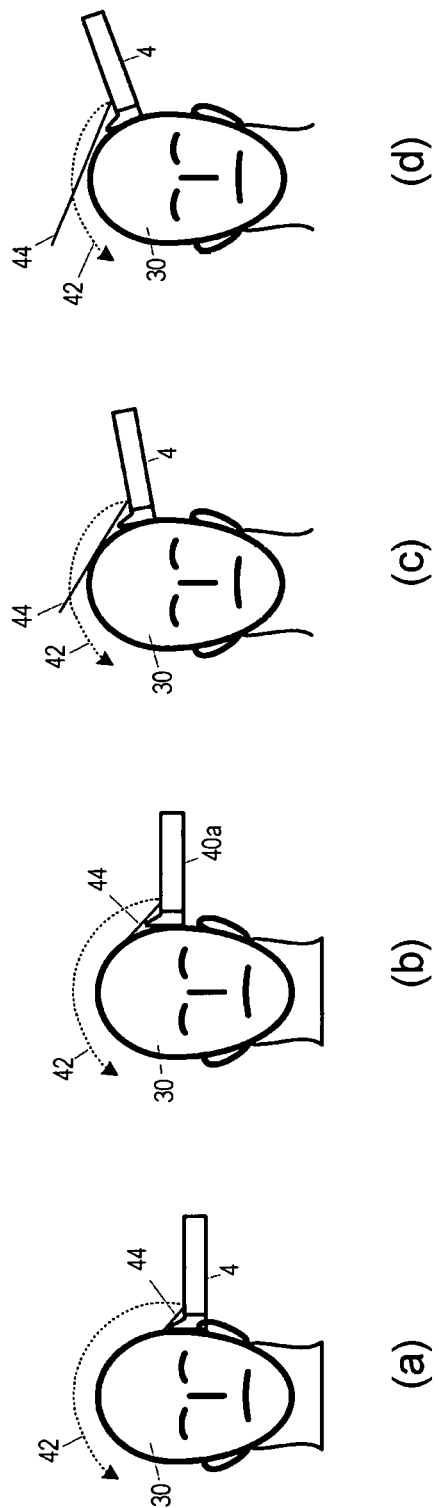
FIG. 8 illustrates a cutting device according to an alternative embodiment in four different positions with respect to the head of a subject.

FIG. 8 illustrates a simple embodiment in which the imaging arrangement 10 measures the distance in a single direction 44. In FIG. 8 a cutting device 4 is shown in four different positions as it moves from the side of the head of a subject 30 to the top of the head along a path 42. It can be seen that in the positions shown in FIGS. 8(a) and (b) the distance measured in direction 44 will be short (since the distance is the distance from the imaging arrangement 10 to the head), but in the positions shown in FIGS. 8(c) and (d), the distance measured in direction 44 will be much larger since it is a measurement of the distance to the environment (due to the curvature of the head at those positions of the cutting device 4). Thus, although this embodiment does not necessarily enable the position of the cutting device 4 to be determined exactly, it is still possible to determine whether the cutting device 4 is on the side of the head (e.g. as in FIGS. 8(a) and (b)) or not (e.g. as in FIGS. 8(c) and (d)).

The analysis of the image data in the embodiments in which the imaging arrangement 10 is a proximity sensor that measures whether an object is proximate the sensor in one or more measurement directions is similar to that described above for the distance or range sensors, except that the boundary 38 is determined to be between neighbouring measurement directions where there is a change from detecting a proximate object or not. For example in FIG. 7(a) the proximity sensor will detect a proximate object in measurement directions 40a, 40b and 40c, but not 40d. Thus the boundary 38 will be determined to be between measurement directions 40c and 40d.

It will be appreciated that the imaging arrangement 10 may combine multiple types of sensors in order to improve the accuracy of the position determination. For example the imaging arrangement 10 can comprise two or more of an IR sensor, a visible light sensor, a distance sensor and a proximity sensor.

In a particular implementation of the invention, the hair cutting system 2 is for automatically cutting the hair according to a desired style, and the controller 8 uses the position determined using the position sensing technique described above to determine the cutting length for the cutting unit 6 at that position on the subject's head and/or to determine whether or not the cutting action of the cutting unit 6 should be activated or deactivated.

For example, the desired hair style (or part of a desired hair style) may include a 'fade out' around the ears and in the neck area (i.e. around the hair line of the subject) in which the hair length is gradually reduced to 0. Currently, a user of a hair cutting device is required to manually change the size of the comb on the hair cutting device in order to change the cutting length or otherwise manually change the cutting length of the cutting unit in order to change the length of the hair left after the cutting unit 6 has passed over the hair. The invention, when used in a cutting device 4 in which the cutting length of the cutting unit 6 can be automatically controlled, enables the cutting device 4 to determine its position on the head of a subject and create a hair style with varying lengths, such as those that include a 'fade out', automatically.

Thus, referring again to the method in FIG. 3, after step 105 in which the position of the cutting device 4 is determined, the controller determines a hair length for the hair of the subject at the determined position of the hair cutting device (step 107).

The controller 8 then outputs a control signal to the cutting unit 6 to configure the cutting unit to cut hair to the determined hair length (step 109).

Alternatively, or in addition, in step 107 the controller can determine whether any cutting of the hair should be performed at the determined position of the hair cutting device 4, and output a control signal to the cutting unit 6 to enable or disable the cutting action as required.

In some embodiments the user of the system 2 can select a predefined hair style before use. The predefined hair style can comprise a predetermined pattern that specifies hair lengths at different positions on the head of the subject required to create the desired hair style (and/or whether any cutting action is required at different positions on the head of the subject). Thus, in step 105, the controller 8 can determine the hair length/hair cutting action for the current position from the predetermined pattern for the desired hair style.

In embodiments where the cutting device 4 is to create a 'fade out' around the hair line of the subject, the controller 8 can control the cutting unit 6 to cut hair to a shorter (first) length when the hair cutting device 4 is found to be near (i.e. within a threshold distance) or at the sides and/or back of the head (or particularly the lower part of the sides and/or back of the head) than when the hair cutting device 4 is determined to be on the top of the head, where, for example, the hair can be cut to a second (longer) length or the cutting action deactivated altogether.

It will be appreciated that these embodiments are not limited to just two hair lengths, and it is possible to create a gradual 'fade out' by setting the cutting unit 6 to cut the hair to increasingly longer lengths as the cutting device 4 is moved away from the hair line on the sides and/or back of the head.

It will be appreciated that the control of the activation and deactivation of the cutting unit 6 based on the determined position is not limited to hair cutting systems 2, and it is possible for a controller 8 in a treating system to control the activation and deactivation of a treating unit (and thus control the activation and deactivation of a treating action) based on the determined position of the treating device 4.

There is therefore provided a treating system and method that enables the position of a treating device to be determined without requiring a positioning structure separate to the treating device to be used.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A treating system for cutting hair, comprising:
   a controller; and
   a treating device defining a hair cutting device, comprising:
      a treating unit defining a cutting unit for treating a part of a body of a subject; and
      an imaging arrangement that is configured to obtain image data;
   wherein the controller is configured to:
      analyze the image data to identify a boundary between the part of the body of the subject and a surrounding environment around the part of the body, and
      determine a device position of the treating device relative to the part of the body of the subject based on a boundary position of the boundary in the image data including based on a distance of the boundary from an edge of an image derived from the image data,
   wherein the controller is configured to determine a height of the treating device on the part of the body based on the distance of the boundary from an upper or a lower edge of the image derived from the image data.

2. The treating system as claimed in claim 1, wherein the imaging arrangement comprises a temperature, thermal or infra-red sensor or sensor array, and wherein the controller is configured to identify the boundary based on a difference between heat emitted by the subject relative to heat emitted by the surrounding environment.

3. The treating system as claimed in claim 1, wherein the imaging arrangement comprises a visible light sensor or sensor array, and wherein the controller is configured to identify the boundary based on a difference between the color and/or shape of the part of the body relative to the color and/or shape of the surrounding environment.

4. The treating system as claimed in claim 1, wherein the part of the body of the subject is a head of the subject.

5. The treating system as claimed in claim 1, wherein the imaging arrangement comprises one or more range sensors that are configured to measure distances from the imaging arrangement to a nearest object in predefined directions from the imaging arrangement.

6. The treating system as claimed in claim 5, wherein the controller is configured to identify the boundary based on which of the measured distances exceed a threshold.

7. The treating system as claimed in claim 1, wherein the imaging arrangement comprises one or more proximity sensors that are configured to detect whether there is an object within a threshold distance to the imaging arrangement in one or more predefined directions from the imaging arrangement.

8. The treating system as claimed in claim 7, wherein the controller is configured to identify the boundary based on which of the one or more predefined directions an object is detected within the threshold distance.

9. The treating system as claimed in claim 1, wherein the controller is further configured to:
   determine a treating action for the part of the body of the subject at the determined device position of the treating device; and
   output a control signal to the treating unit to configure the treating unit to perform the determined treating action.

10. The treating system as claimed in claim 1, wherein the controller is further configured to:
    determine whether a treating action is required for the part of the body of the subject at the determined device position of the treating device; and
    output a control signal to the treating unit to activate or deactivate the treating unit according to whether a treating action is required.

11. The treating system as claimed in claim 1, wherein the treating system is a hair cutting system for cutting the hair and a hair cutting length of the cutting unit is configurable based on a control signal from the controller, and wherein the controller is further configured to:
    determine a hair length for the hair of the subject at the determined device position of the hair cutting device; and
    output a control signal to the cutting unit to configure the cutting unit to cut the hair to the determined hair length.

12. A treating system, comprising:
    a controller; and
    a treating device, the treating device comprising:
       a treating unit for treating a part of a body of a subject; and
       an imaging arrangement that is configured to obtain image data;
    wherein the controller is configured to:
       analyze the image data to identify a boundary between the part of the body of the subject and a surrounding environment around the part of the body; and
       determine a device position of the treating device relative to the part of the body of the subject based on a boundary position of the boundary in the image data,
    wherein the part of the body of the subject is a head of the subject, and wherein the controller is configured to identify an ear of the subject in the image data and (i) determine a height of the treating device on the head based on a distance of the boundary from an upper or a lower edge of an image derived from the image data and an ear position of the ear in the image; and/or (ii) determine whether the treating device is on a side or a back of the head based on the ear position of the ear in the image.

13. The treating system of claim 12, wherein the imaging arrangement comprises a temperature, thermal or infra-red sensor or sensor array, and wherein the controller is configured to identify the boundary based on a difference between heat emitted by the subject relative to heat emitted by the surrounding environment.

14. The treating system of claim 12, wherein the imaging arrangement comprises a visible light sensor or sensor array, and wherein the controller is configured to identify the boundary based on a difference between the color and/or shape of the part of the body relative to the color and/or shape of the surrounding environment.

15. The treating system of claim 12, wherein the imaging arrangement comprises one or more range sensors that are configured to measure a distance from the imaging arrangement to a nearest object in one or more predefined directions from the imaging arrangement.

16. The treating system of claim 12, wherein the imaging arrangement comprises one or more proximity sensors that are configured to detect whether there is an object within a threshold distance to the imaging arrangement in one or more predefined directions from the imaging arrangement.

17. The treating system of claim 16, wherein the controller is configured to identify the boundary based on which of the one or more predefined directions an object is detected within the threshold distance.

18. A method of determining a device position of a hair cutting device of a hair cutting system, the hair cutting device comprising a trimmer for trimming hair of a part of a body of a subject; the method comprising acts of:
- obtaining image data using an imaging arrangement;
- deriving an edge of an image from the image data;
- analyzing the image data to identify a boundary between the part of the body of the subject and an environment around the part of the body; and
- determining the device position of the hair cutting device relative to the part of the body of the subject based on a position of the boundary in the image data including based on a distance of the boundary from the edge of the image,
- wherein the method further comprises an act of determining a height of the hair cutting device on the part of the body of the subject based on the distance of the boundary from an upper or a lower edge of the image.

19. A computer program product comprising a non-transitory computer readable medium having computer readable code embodied therein, the computer readable code being configured such that, on execution by a processor, the processor is caused to perform the method of claim 18.

* * * * *